(12) United States Patent
Wakahara et al.

(10) Patent No.: US 7,975,477 B2
(45) Date of Patent: Jul. 12, 2011

(54) DRIVING DEVICE AND METHOD OF MANUFACTURING THE SAME

(75) Inventors: Junya Wakahara, Habikino (JP); Shigeru Wada, Kishiwada (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 627 days.

(21) Appl. No.: 12/105,571

(22) Filed: Apr. 18, 2008

(65) Prior Publication Data

US 2008/0256946 A1    Oct. 23, 2008

(30) Foreign Application Priority Data

Apr. 23, 2007    (JP) .................................. 2007-112826

(51) Int. Cl.
*F01B 29/10* (2006.01)
(52) U.S. Cl. ............. 60/527; 60/528; 310/306; 310/307
(58) Field of Classification Search ............ 60/527–529; 310/306–309
See application file for complete search history.

(56) References Cited

U.S. PATENT DOCUMENTS

| | | | | |
|---|---|---|---|---|
| 4,761,955 A | * | 8/1988 | Bloch | 60/528 |
| 5,186,420 A | * | 2/1993 | Beauchamp et al. | 244/219 |
| 6,006,522 A | * | 12/1999 | Foss et al. | 60/528 |
| 7,451,595 B2 | * | 11/2008 | Komori et al. | 60/527 |
| 2006/0266031 A1 | * | 11/2006 | Kosaka et al. | 60/527 |

FOREIGN PATENT DOCUMENTS

| | | |
|---|---|---|
| JP | 2002-98911 A | 4/2002 |
| JP | 2006-189036 A | 7/2006 |

* cited by examiner

*Primary Examiner* — Hoang M Nguyen
(74) *Attorney, Agent, or Firm* — Sidley Austin LLP

(57) ABSTRACT

A driving device and driving device manufacturing method that ensure stable fixing of an SMA, without causing difficulties in downsizing the device, and without adversely affecting the performance of the SMA. A driving device equipped with a string-shaped shape memory alloy as a drive source includes a base member constituting a basis of the driving device, and a rod-like member which penetrates the base member and is made of the metal fixed onto this base member. The rod-like member is caulked on one end of this rod-like member so that the aforementioned shape memory alloy is pinch-held in-between, whereas power-feeding members to apply current to the shape memory alloy are arranged on the other end of the rod-like member.

18 Claims, 7 Drawing Sheets

DRIVING DEVICE AND METHOD OF MANUFACTURING THE SAME

This application is based on Japanese Patent Application No. 2007-112826 filed on Apr. 23, 2007, in Japanese Patent Office, the entire content of which is hereby incorporated by reference.

TECHNICAL FIELD

The present invention relates to a driving device and method of manufacturing the same, particularly to a driving device provided with a shape memory alloy and method of manufacturing the same.

BACKGROUND OF THE INVENTION

In recent years, attempts have been made to use as actuators various forms of driving devices provided with a shape memory alloy (hereinafter referred to as "SMA"). The SMA is typically represented by a titanium-nickel alloy. It has a property that even if the SMA is deformed at a temperature lower than the temperature called "transformation point", it goes back to the original state by martensite transformation when it is heated above that temperature. Normally, the SMA is made in the form of a string, and is expanded and contracted along the length by electricity-powered heat control, whereby the SMA can be used as an actuator.

Such an SMA has a wire size as small as several tens of microns. This allows downsizing of an apparatus equipped with the SMA actuator. Thus, studies have been made to mount the SMA on various types of apparatuses.

Incidentally, generally, such a string-like SMA is supported on a base member, which is provided on a frame or casing, through a fixing member to fix both ends thereof, and is extended to a driven member. Further, there is provided is on or around the fixing member an electrical connection terminal to which a lead wire or a flexible printed circuit board for applying electricity to the SMA is to be connected.

For example, according to one of the techniques known in the conventional art, an SMA is pinch-held to be fixed by pressure contact in a pinching section formed by bending a plate-formed member. A lead wire for supplying electricity to the SMA is inserted between an annular washer member provided at the sandwiching section and the base member, and is secured by a screw (Unexamined Japanese Patent Application Publication No. 2006-189036).

In another known technique, an SMA is fixed by press-fitting together with a ball or wedge into the hole provided in a base member, and a lead wire for supplying electricity to the SMA is soldered onto the connection terminal arranged in the vicinity of the hole of the base member (Unexamined Japanese Patent Application Publication No. 2002-98911).

However, the technique disclosed in the Unexamined Japanese Patent Application Publication No. 2006-189036 provides a so-called lag plate where the washer member connected with the lead wire and the sandwiching section where the SMA is pinch-held to be fixed by pressure contact are laterally integrated. This structure requires a large two-dimensional space and may cause difficulties in downsizing the device.

In the technique disclosed in the Unexamined Japanese Patent Application Publication No. 2002-98911, the hole of the base member to which the SMA is fixed and the connection terminal to which the lead wire is soldered are located close to each other. This structure may cause the SMA performance to be adversely affected by heat transmission resulting from soldering work.

SUMMARY

An object of the present invention is to solve the aforementioned problems and to provide a driving device and method of manufacturing the driving device that ensure stable fixing of the SMA, without causing difficulties in downsizing the device, and without adversely affecting the performance of the SMA.

In view of forgoing, one embodiment according to one aspect of the present invention is a driving device, comprising:
 a base member;
 a string-like shape memory alloy; and
 a rod-like member which is made of metal, extends through the base member and is secured to the base member; the rod-like member including:
  a caulking portion on a first end of the rod-like member by which the shape memory alloy is pinch-held; and
  an electrical connection portion on a second end of the rod-like member for supplying electricity to the shape memory alloy.

According to another aspect of the present invention, another embodiment is a method of manufacturing a driving device, the method comprising the steps of:
 securing a rod-like metal member having a caulking portion on a first end thereof to a base member, the rod-like metal member extending through the base member with at least a part of the caulking portion protruded from the base member; and
 caulking the caulking portion to pinch-hold a string-like shape memory alloy,
 wherein a second end of the rod-like member functions as an electrical connection portion for supplying electricity to the shape memory alloy.

BRIEF DESCRIPTION OF THE PREFERRED EMBODIMENT

Figure 1A:
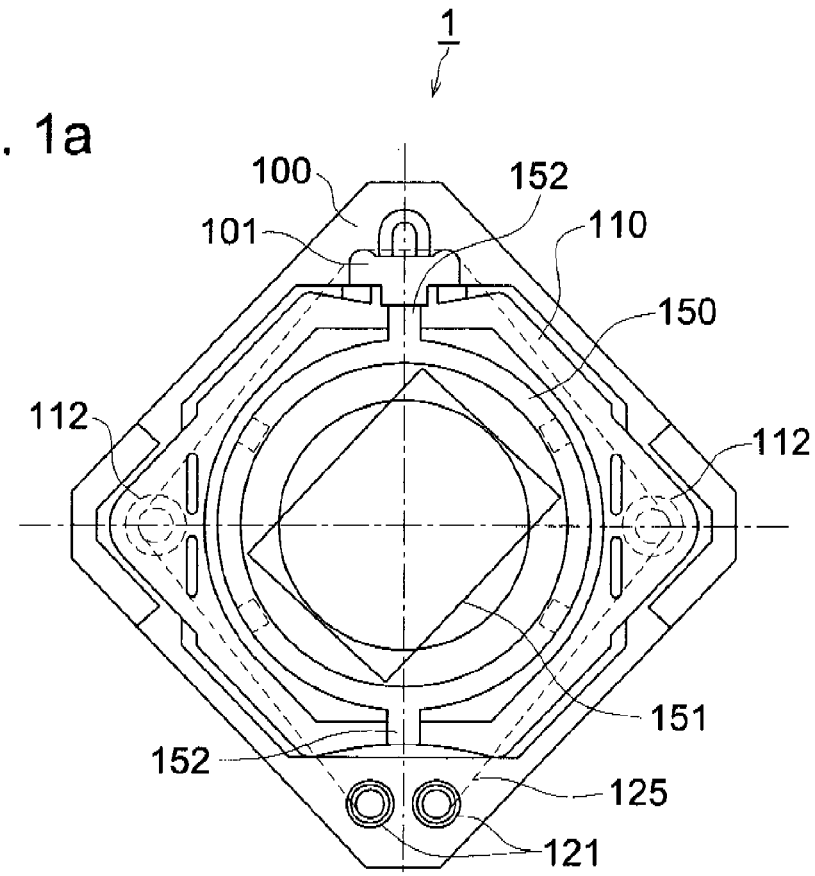
FIGS. 1a and 1b are external views of a lens driving device as an embodiment of the present invention.

Referring to the drawings, the following describes the lens driving device of one of typical embodiments of driving devices according to an embodiment of the present invention. It should be noted that the present invention is not restricted thereto, although the present invention is described with reference to the illustrated embodiments.

Figure 1B:
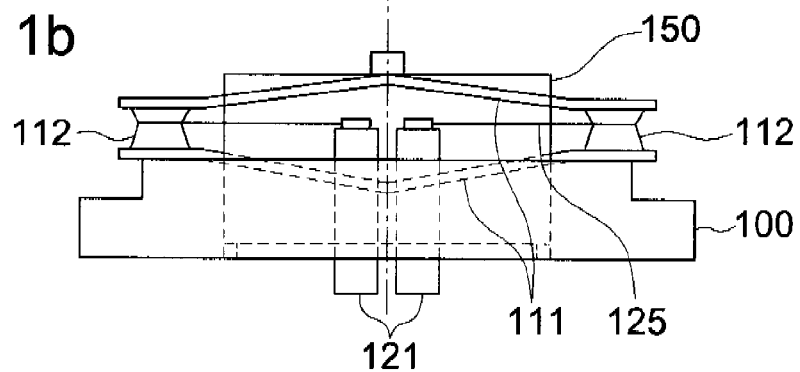

In the first place, the structure of the lens driving device will be explained with reference to FIGS. 1a and 1b. FIG. 1a is a plan view showing the external view of the lens driving device 1. FIG. 1b is a front view thereof.

As shown in FIG. 1a, the major portions of the lens driving device 1 include a base member 100, pantograph section 110, SMA fixing member 121, SMA 125, and lens barrel 150.

As shown in FIG. 1b, two rod-like metal SMA fixing members 121 are fixed in a form of penetrating the base member 100. The SMA fixing member 121 corresponds to the rod-like member of the present invention.

Both ends of the SMA 125 are fixed on the top end of the SMA fixing member 121 by caulking. The details of the method of caulking of the SMA 125 will be described later.

The SMA 125, which has a string-like shape with a diameter of, for example, several tens of microns, is extended so as to be twisted around two string-shaped spacers 112 provided on the pantograph section 110 and a tension guide 101 provided on the base member 100.

At the center of the base member 100, a lens barrel 150 equipped with a lens (not illustrated) is held on the pantograph section 110 by hook sections 152. An image pickup element 151 such as a CCD (Charge Coupled Device) or CMOS sensor is provided under the lens barrel 150, wherein this image pickup element generates an image signal by photoelectric conversion of the optical image of a subject formed by the lens.

Figure 2A:
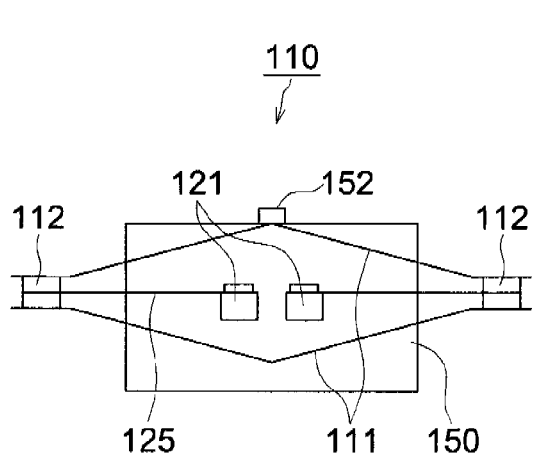
FIGS. 2a and 2b are schematic diagrams representing the operation of the pantograph section.
Figure 2B:
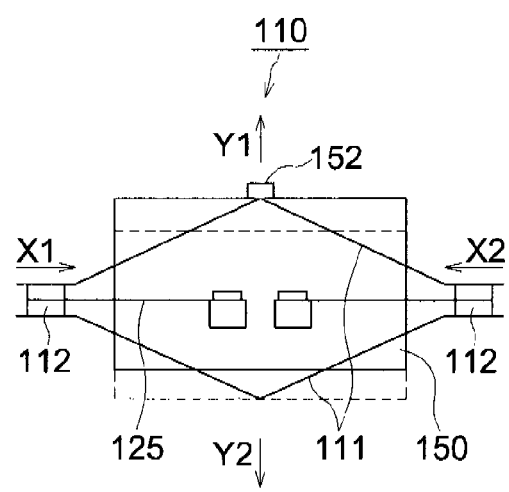

Referring to FIGS. 2a and 2b, the following describes the structure and operation of the pantograph section 110. FIG. 2a is a schematic diagram showing the front view of the situation of the pantograph section 110 wherein electric current is not applied to the SMA 125. FIG. 2b is a schematic diagram showing the front view of the situation of the pantograph section 110 wherein electric current is applied to the SMA 125.

As shown in FIG. 2a, the pantograph section 110 includes two sheet-like drive arms 111 provided on the upper and lower portions and two spacers 112 sandwiched between the two drive arms 111. The spacer 112 is made of polyimide, for example.

As shown in FIG. 2b, when electric current is applied to the SMA 125, the SMA 125 contracts, whereby two spacers 112 are pulled in the arrow-marked directions X1 and X2, respectively, and are moved inwardly. As the spacer 112 moves inwardly, two drive arms 111 bend in the arrow-marked directions Y1 and Y2, respectively. Then the lens barrel 150 held by the drive arm 111 through the hook sections 152 is pushed up and is moved to the arrow-marked direction Y1. Thus, the lens barrel is driven by power on/off control of the SMA 125, as shown above.

Figure 3A:
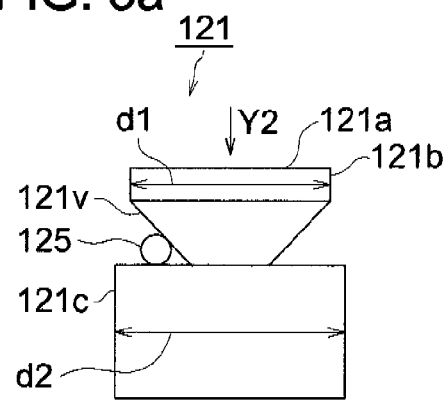
FIGS. 3a, 3b, 3c, 3d, 3e and 3f are schematic diagrams representing the shape of the caulking portion of the SMA fixing member.
Figure 3B:
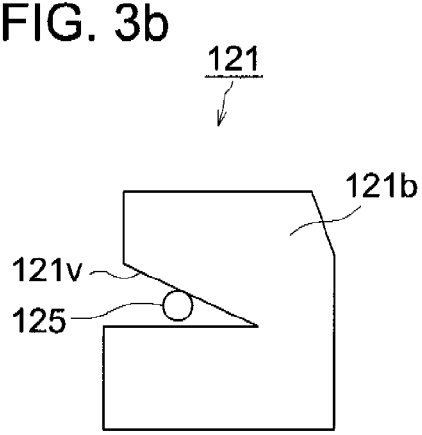
Figure 3C:
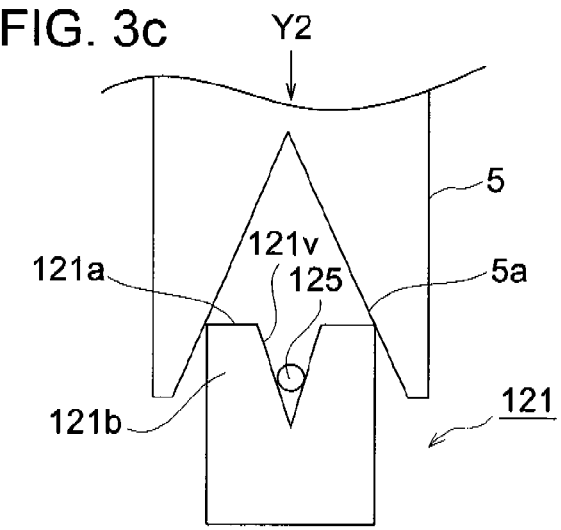
Figure 3D:
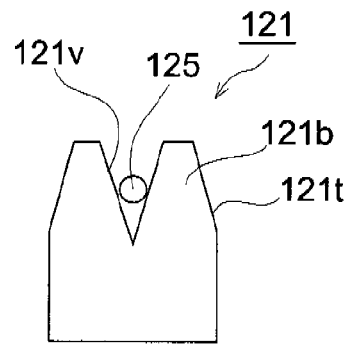
Figure 3E:
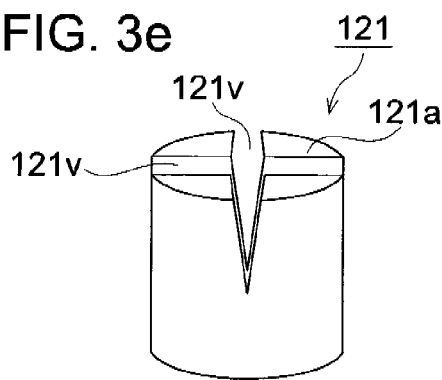
Figure 3F:
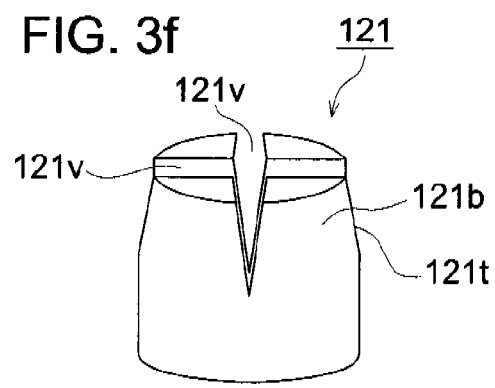
Figure 4A:
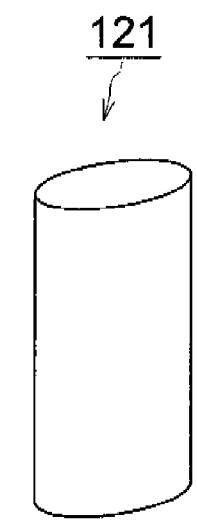
FIGS. 4a and 4b are schematic diagrams representing the shape of the SMA fixing member.
Figure 4B:
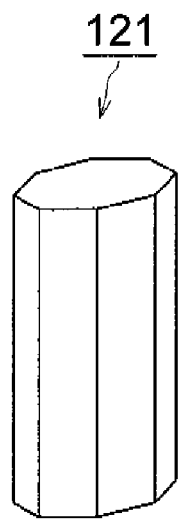

Referring to FIGS. 3a, 3b, 3c, 3d, 3e and 3f, and FIGS. 4a and 4b, the following describes the SMA fixing member 121. FIG. 3a is a schematic diagram showing the front view of an example of the shape of the caulking portion of the SMA fixing member 121. FIGS. 3b through 3d are schematic diagrams of the front view showing the shape in other examples of the caulking portion of the SMA fixing member 121. FIGS. 3e and 3f are the schematic diagrams showing the shape in other examples of the caulking portion of the SMA fixing member 121, as viewed obliquely from the forward position on the front. FIG. 4a is a schematic diagram showing the perspective view of the shape of an example of the SMA fixing member 121. FIG. 4b is a schematic diagram showing the perspective view of the shape of another example of the SMA fixing member 121.

As shown in FIG. 3a, a V-shaped groove 121v is formed around the side surface of the SMA fixing member 121, and the SMA 125 is pinch-held in this groove 121v. When a load is applied to the end face 121a of the SMA fixing member 121 in the direction Y2, the end portion 121b as the caulking portion of the SMA fixing member 121 is deformed and the SMA 125 is fixed by pressure contact (caulking). To prevent the SMA 125 from being cut off when the end portion 121b deformed by caulking covers over a non-deformation portion 121c, the diameter d1 of the end portion 121b is made smaller than the diameter d2 of the non-deformation portion 121c. As will be described later, when the SMA fixing member 121 is press-fit into the base member 100, deformation may occur if the end portion 121b of the SMA fixing member 121 is pushed. Accordingly, the non-deformation portion 121c is pushed into the base member 100 for press-fitting. In this case as well, the diameter d1 of the end portion 121b is smaller than the diameter d2 of the non-deformation portion 121c to ensure that the end portion 121b will not be caught by the press-fit hole of the base member 100.

FIG. 3b shows the shape of another example of the caulking portion. As shown in FIG. 3b, the v-shaped groove 121v can be arranged in a part of the side surface of the end portion 121b of the SMA fixing member 121.

FIG. 3c shows the shape of still another example of the caulking portion. As shown in FIG. 3c, the groove 121v can be arranged on the end face 121a of the SMA fixing member 121. In this case, the end portion 121b of the SMA fixing member 121 is caulked by the pressure applied in the direction Y2 with a caulking jig 5, shown in FIG. 3c, with a taper 5a formed on the inner surface. Further, as shown in FIG. 3d, a taper 121t can be formed on the end portion 121b of the SMA fixing member 121. This will avoid catching of the end portion 121b when the SMA fixing member 121 is pushed into the base member 100 to be fixed.

FIG. 3e shows the shape of a further example of the caulking portion. As shown in FIG. 3e, two grooves 121v can be arranged in the shape of a cross on the end face 121a of the SMA fixing member 121. This increases the degree of freedom in the direction of rotation when the SMA fixing member 121 is pushed into the base member 100. Further, as shown in FIG. 3f, the taper 121t can be formed on the end portion 121b of the SMA fixing member 121. This will avoid catching of the end portion 121b when the SMA fixing member 121 is pushed into the base member 100 to be fixed. Any of the shapes shown in FIGS. 3a through 3f can be easily formed by the well known machining operation.

As shown in FIGS. 4a and 4b, the SMA fixing member 121 has a cross section of a circular shape or a polygonal shape. If the groove 121v is formed around the side surface of the SMA fixing member 121 as shown in FIG. 3a, there is no need of taking the rotational direction into account when the SMA fixing member 121 is fixed onto the base member 100. Thus, the SMA fixing member 121 is preferably formed in a cylinder, as shown in FIG. 4a. In the meantime, when the groove 121v is formed in a doglegged shape on a part of the side surface of the SMA fixing member 121, as shown in FIG. 3b, direction must be taken into account when the SMA fixing member 121 is fixed onto the base member 100. Thus, the SMA fixing member 121 is preferably formed in a polyangular prismatic shape, which has directionality, as shown in FIG. 4b. The SMA fixing member 121 shown in FIG. 4b is octangular prismatic as an, for example, but the present invention is not restricted thereto. It can be shaped in an N-angular prismatic shape (wherein N is a positive integer) or D-cut formed.

Since the SMA 125 is held in position by the elasticity of the caulked SMA fixing member 121, the SMA fixing member 121 is preferably made of SUS steel or copper-family metal material having a Young's modulus of not less than 50 and not more than 250 GPa, with consideration given to the holding force and caulking pressure. Further, such a metal material can be adjusted to have a desired Young's modulus by controlling the percentage of alloy components, the volume of additives used, or heat treatment. In case of the SUS steel, adjustment can be made by controlling the percentage of alloy components or heat treatment so that the SUS steel is in optimum conditions for caulking. Further, the copper-family metal in the sense in which it is used here refers to the alloy mainly composed of copper or to pure copper. Similarly to the case of the SUS steel, adjustment can be made by controlling the percentage of alloy components or heat treatment so that the SUS steel is in the optimum conditions for caulking. It should be pointed out that the copper-family metal is characterized in that it is easily cut, and plating work is not needed because it can be directly soldered without additional surface treatment. This reduces the production cost. Further, when SUS steel is used for the SMA fixing member 121, as will be described later, the surface of the SUS steel is preferably provided with nickel plating to improve the efficiency of soldering the power-feeding members such as a lead wire or a flexible printed circuit board for applying electric current to the SMA 125.

As described above, a single rod-like member, namely, the SMA fixing member 121 is used for two purposes of fixing the SMA 125 and connecting with the power-feeding member for supplying current to the SMA 125, and the SMA fixing member 121 is fixed by penetrating the base member 110. This arrangement allows the SMA fixing member 121 to be installed in a small space whose area is equal to the area of the cross section in the radial direction, whereby downsizing of the apparatus is achieved.

Figure 5:
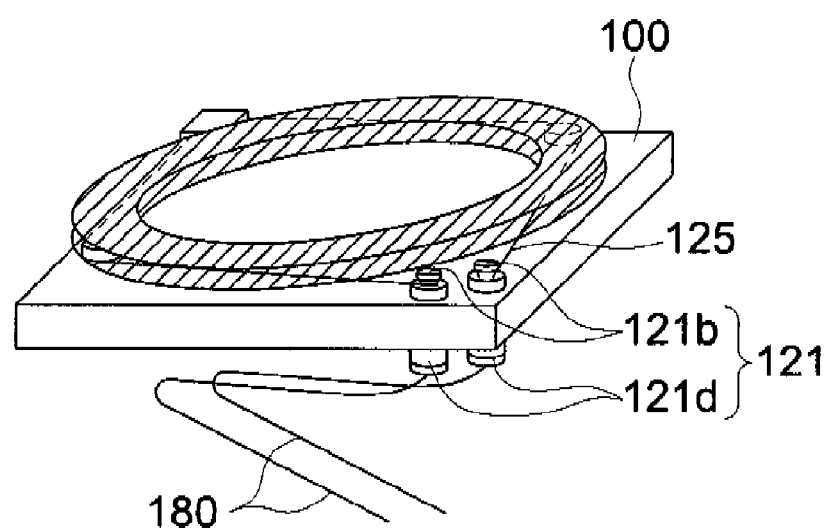
FIG. 5 is a schematic diagram showing a method of connecting between the SMA fixing member and the lead wire.

Referring to FIG. 5, the following describes the procedure of connecting the SMA fixing member 121 to the power-feeding member such as a lead wire or a flexible printed circuit board for applying electric current to the SMA 125. FIG. 5 is a schematic diagram showing a method of connecting between the SMA fixing members 121 and the lead wires 180.

As shown in FIG. 5, the lead wires 180 are soldered onto the end portion 121d (the electrical connection portion of the present invention) which is on the side opposite to the caulking portion 121b of the SMA fixing member 121 with the base member 100 in-between. In this case, the distance between the caulking portion 121b on which the SMA 125 is fixed by pressure contact and the end portion 121d to which the lead wire 180 is soldered can be not less than at least the thickness of the base member 100. Heat is also released to the base member 100. This arrangement reduces the transmission of heat to the SMA 125 at the time of soldering, and minimizes the possible deterioration in the performance of the SMA 125.

The following describes the procedure of fixing the SMA fixing member 121 onto the base member 100.

The base member 100 is required to have a strength for stable holding of the lens barrel 150, and is formed to have a predetermined thickness to meet this requirement. Further, the base member 100 is made of a non-conducting material to avoid electric short-circuiting between two SMA fixing members 121 to be connected with the power-feeding members. If the base member 100 is made of a conducting material, insulating treatment is provided between the base member 100 and the two SMA fixing members 121.

The SMA fixing members 121 can be fixed onto the base member 100 (securing step) by the insert mold method wherein the SMA fixing members 121 are molded integrally with the base member 100. Alternatively, the SMA fixing members 121 are pushed into the holes to be fixed in position, the holes which are provided beforehand in the base member 100.

As shown in FIG. 3b, when the V-shaped groove 121v of the SMA fixing member 121 is not axially symmetric and has directionality, the direction of the groove 121v should be determined in conformity to the direction of the SMA 125 to be mounted. In this case, the SMA fixing member 121 is formed to have directionality, as shown in FIG. 4 (b), and the position of the groove 121v is determined in the direction of the SMA 125. For example, in the case of insert mold method, there is provided in the die the shape by which the direction can be determined. Further, in the case of press-fitting, the hole for press-fitting is designed to have a polygonal or D-cut form that allows the direction to be determined.

Figure 6:
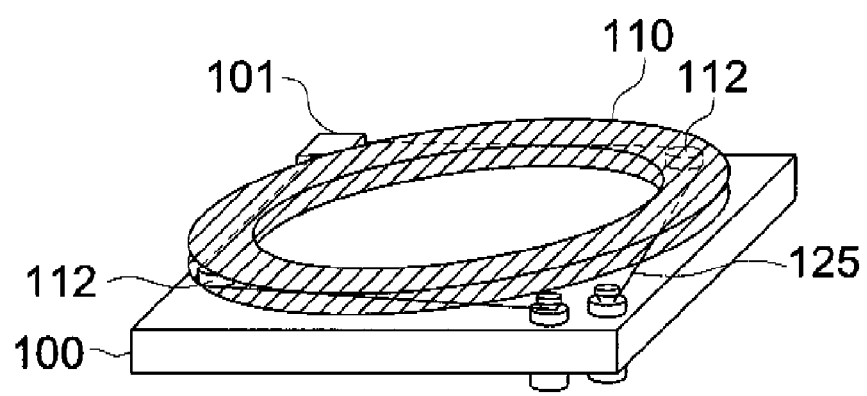
FIG. 6 is a schematic diagram showing a method of installing the SMA.
Figure 7:
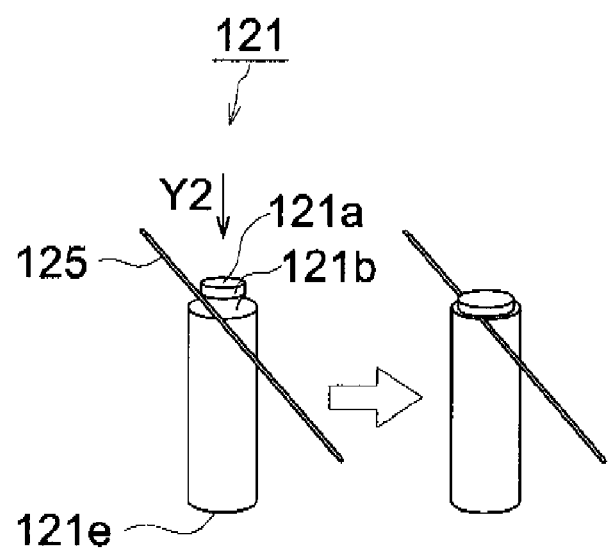
FIG. 7 is a schematic diagram showing how to caulk the SMA fixing member with the SMA.

Referring to FIGS. 6 and 7, the following describes the procedure of caulking. FIG. 6 is a schematic diagram showing the method of extending the SMA 125. FIG. 7 is a schematic diagram showing how to caulk the SMA fixing member 121 with the SMA 125.

As shown in FIG. 6, the SMA 125 is locked on the two spacers 112 mounted on the pantograph section 110 and the tension guide 101 mounted on the base member 100, and is extended so that a predetermined tension is applied.

As shown in FIG. 7, the caulking portions 121b of the SMA fixing members 121 located on both sides of the extended SMA 125 are pressed by the pressure in the direction Y2 to caulk, and the SMA 125 is held to be sandwiched between the SMA fixing members 121 (caulking step).

Since the SMA fixing member 121 is fixed by penetrating the base member 100, the end face 121e opposite to the end face 121a used for caulking of the SMA fixing member 212 can be supported when caulking is executed. This arrangement allows the caulking force to be applied directly to the rod-like member without being applied through other members. This eliminates unstable factors in the caulking work. Thus, the SMA is securely fixed in position and stable production is ensured.

Figure 8:
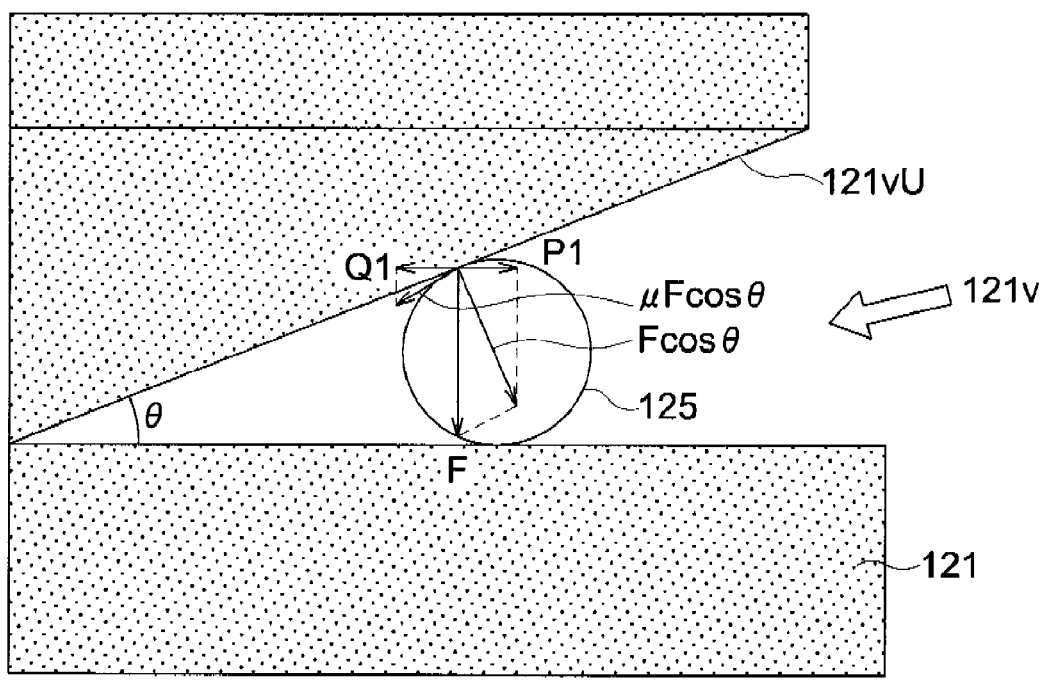
FIG. 8 is a schematic diagram showing the cut-in angle of the caulking portion of the SMA fixing member.

Referring to FIG. 8, the following describes the cut-in angle of the V-shaped groove 121v formed in the SMA fixing member 121. FIG. 8 is a schematic diagram showing the relationship between the cut-in angle of the groove 121v and the static friction force between the SMA 125 and SMA fixing member 121.

To prevent the SMA 125 from slipping out of the groove 121v at the time of caulking work, the cut-in angle of the caulking portion must be set to a proper value. The details will be described below.

Assume that caulking force is F, the cut-in angle of the groove 121v is $\Theta$, and the coefficient of static friction between the SMA 125 and SMA fixing member 121 is $\mu$. The slip-out force P1 and friction force Q1 on the upper surface (slope) 121vU of the groove 121v can be calculated by the following Formulas 1 and 2 in conformity to FIG. 8:

$$P1 = F \cdot \cos\Theta \cdot \sin\Theta \quad \text{(Formula 1)}$$

$$Q1 = \mu \cdot F \cdot \cos\Theta \cdot \cos\Theta \quad \text{(Formula 2)}$$

To prevent the SMA 125 from slipping out of the groove 121v, the friction force Q1 must be set at a level greater than the slip-out force P1. To be more specific, according to the Formulas 1 and 2, the cut-in angle $\Theta$ and static friction force $\mu$ are required to satisfy the following relationship of Relationship 1:

$$F \cdot \cos\Theta \cdot \sin\Theta < \mu \cdot F \cdot \cos\Theta \cdot \cos\Theta \quad \text{(Relationship 1)}$$

Relationship 2 is the result of simplifying the Relationship 1. The cut-in angle Θ is set at the value satisfying Relationship 2.

$$\tan Θ < μ \quad \text{(Relationship 2)}$$

The following describes how to drive the lens driving device 1. The SMA 125 is controlled according to the principle that the resistance value of the SMA 125 has a linear relationship with the deformation value. To put it more specifically, the deformation value required to move the lens barrel 150 by a predetermined distance can be calculated from the overall length of the SMA 125. Thus, The resistance corresponding to the deformation value of the SMA 125 required to move the lens barrel 150 to a target position is calculated. This is followed by driving the lens barrel 150 by controlling the drive voltage of the SMA 125 so that the resistance value of the SMA 125 becomes the target resistance, whereby the lens barrel 150 is driven.

Figure 9:
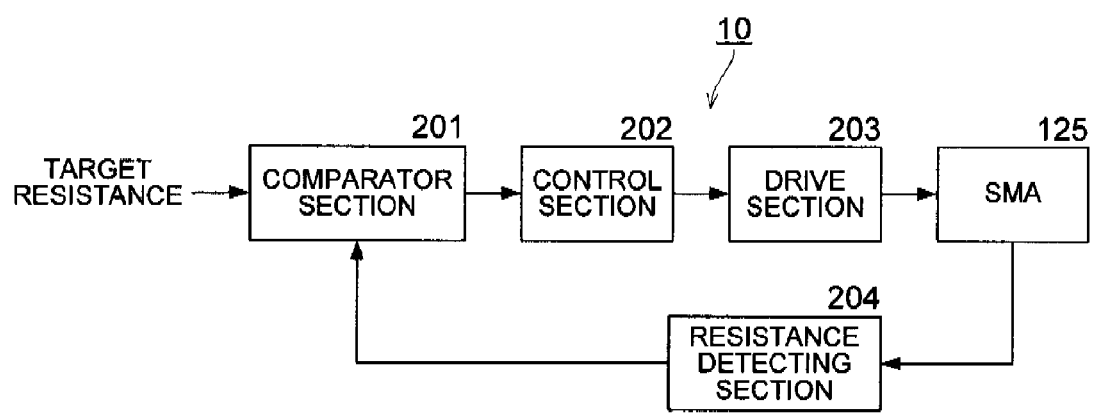
FIG. 9 is a block diagram of the control system.

FIG. 9 shows an example of a control system 10 of the lens driving device 1. As shown in FIG. 9, the control system 10 includes a comparator section 201, control section 202, drive section 203 and resistance detecting section 204. The drive voltage of the SMA 125 is controlled so that the resistance value of the SMA 125 approaches the target resistance inputted from a camera body (not illustrated) or the like.

In the first place, the resistance detecting section 204 detects the resistance of the SMA 125 mounted on the lens driving device 1. The comparator section 201 compares between the resistance of the SMA 125 detected by the resistance detecting section 204 and the target resistance inputted from the camera body, whereby difference is calculated. The control section 202 calculates the drive voltage for the SMA 125 in conformity to the difference calculated by the resistance detecting section 204. The drive section 203 generates the drive voltage based on the drive voltage for the SMA 125 calculated by the control section 202, and applies it to the SMA 125. The SMA 125 is deformed by the drive voltage applied from the drive section 203 so that the lens barrel 150 is driven. This procedure is repeated until the difference calculated by the comparator section 201 is reduced to zero, whereby the lens barrel 150 is driven up to the target position.

According to the present embodiment, one rod-like member is used to fix the SMA thereto, and to connect with the power-feeding member for supplying electric current to the SMA. This rod-like member is fixed by penetrating the base member. This arrangement allows the rod-like member to be installed in a small space whose area is equal to the area of the cross section in the radial direction, whereby downsizing of the apparatus is achieved.

Further, the SMA is fixed onto one end of the rod-like member penetrating the base member, and power-feeding members were connected to the other end. In this arrangement, a predetermined thickness is required to be thick enough to ensure that the base member is strong enough to hold the rod-like member penetrating the same. This arrangement prevents the performance of the SMA from being deteriorated, because when the conductive members are soldered onto the rod-like member, enough distance is secured to prevent the transmitted heat from affecting the performance of the SMA. This avoids the possible deterioration in the performance of the SMA.

When pressure contact, namely, a caulking work of the rod-like member is conducted, the rod-like member can be supported at the end opposite to the end to be caulked, because the rod-like member extends through the base member to be fixed thereto. This arrangement allows the caulking force to be applied directly to the rod-like member without being applied through other members. This eliminates unstable factors in the caulking work. Thus, the SMA is securely fixed in position and stable production is ensured.

What is claimed is:

1. A driving device, comprising:
    a base member;
    a string-like shape memory alloy; and
    a rod-like member which is made of metal and is secured through the base member; the rod-like member including:
        a crimp portion which is provided on one end of the rod-like member and protrudes on one side of the base member;
        a rod-like member main body formed integrally with the crimp portion, wherein the crimp portion has a first pinch surface facing the rod-like member main body, the rod-like member main body has a second pinch surface facing the first pinch surface, and the shape memory alloy is pinch-held between the first pinch surface and the second pinch surface; and
        an electrical connection portion which is provided in connection with the rod-like member main body and is to be coupled, on the other side of the base member from the crimp portion, to an external power supply to supply electricity to the shape memory alloy.

2. The driving device of claim 1, wherein a diameter of a cross section of the crimp portion in a direction perpendicular to an axis of the rod-like member is smaller than a diameter of the rod-like member main body.

3. The driving device of claim 1, wherein the rod-like member is made of metal which has a Young's modulus of not less than 50 GPa and not greater than 250 GPa.

4. The driving device of claim 3, wherein the rod-like member includes a cupper family metal.

5. The driving device of claim 3, wherein the rod-like member includes an SUS steel.

6. The driving device of claim 1, wherein the electrical connection portion is nickel plated.

7. The driving device of claim 1, wherein an end portion of the shape memory alloy protrudes from the rod-like member.

8. The driving device of claim 1, wherein the rod-like member has a circular cross-section.

9. A method of manufacturing a driving device, the method comprising the steps of:
    securing a rod-like member made of metal to a base member, wherein the rod like member has:
        a crimp portion on one end of the rod-like member;
        a rod-like member main body which is formed integrally with the crimp portion and has a groove between the crimp portion and the rod-like member main body; and
        an electrical connection portion which is provided in connection with the rod-like member main body and is to be connected with an external power supply to receive electricity,
        wherein the rod-like member is disposed such that the rod-like member extends through the base member with the crimp portion protruded on one side of the base member and with the electrical connection portion being on the other side of the base member;
    placing a string-like shape memory allay in the groove; and
    pressing the crimp portion toward the rod-like member main body so as to narrow the groove to pinch-hold the shape memory alloy between the crimp portion and the rod-like member main body.

10. The method of claim 9, wherein before the step of pressing the crimp portion, a diameter of a cross-section of the crimp portion in a direction perpendicular to an axis of the rod-like member is smaller than a diameter of a cross-section of the rod-like member main body.

11. The method of claim 9, wherein before the step of pressing the crimp portion, the groove has a V-shape, and an angle Θ between inner surfaces of the V-shaped groove and a coefficient of static friction μ between the inner surface of the V-shaped groove and the shape memory alloy satisfy the following relationship:

$$\tan \Theta < \mu.$$

12. A driving device, comprising:
a base member;
a string-like shape memory alloy; and
a rod-like member which is made of metal and is secured through the base member;
the rod-like member including:
a pair of crimp portions which are provided on one end of the rod-like member in a direction approximately perpendicular to an axis of the rod-like member and protrude on one side of the base member, wherein one of the crimp portions has a first pinch surface facing the other one of the crimp portions, the other one of the crimp portions has a second pinch surface facing the one of the crimp portions, and the shape memory alloy is sandwiched between the first pinch surface and the second pinch surface;
a rod-like member main body formed integrally with both of the crimp portions; and
an electrical connection portion which is provided in connection with the rod-like member main body and is to be coupled, on the other side of the base member, to an external power supply to supply electricity to the shape memory alloy.

13. The driving device of claim 12, wherein the rod-like member has a smaller diameter at a position closer to an end face of the one end of the rod-like member.

14. The driving device of claim 12, wherein the rod-like member has a polygonal cross-section.

15. A method of manufacturing a driving device, the method comprising the steps of:
securing a rod-like member made of metal to a base member, wherein the rod like member has:
a pair of crimp portions which are provided on one end of the rod-like member in a direction approximately perpendicular to an axis of the rod-like member and have a groove therebetween;
a rod-like member main body formed integrally with both of the crimp portions; and
an electrical connection portion which is provided in connection with the rod-like member main body and is to be coupled to an external power supply to receive electricity,
wherein the rod-like member is disposed such that the rod-like member extends through the base member with the crimp portions protruded on one side of the base member and with the electrical connection member being on the other side of the base member;
placing a string-like shape memory alloy in the groove; and
pressing the crimp portions, with a surface inclined to an axis of the rod-like member, toward the rod-like member main body so as to narrow the groove to pinch-hold the shape memory alloy between the crimp portions.

16. The method of claim 15, wherein before the step of pressing the crimp portions, the groove has an opening across an end face of the one end of the rod-like member.

17. The method of claim 15, wherein before the step of pressing the crimp portions, the rod-like member has a smaller diameter at a position closer to an end face of the one end.

18. The method of claim 15, wherein the rod-like member has a polygonal cross-section.

* * * * *

UNITED STATES PATENT AND TRADEMARK OFFICE
CERTIFICATE OF CORRECTION

PATENT NO.      : 7,975,477 B2
APPLICATION NO. : 12/105571
DATED           : July 12, 2011
INVENTOR(S)     : Junya Wakahara and Shigeru Wada It is certified that error appears in the above-identified patent and that said Letters Patent is hereby corrected as shown below:

Column 8:
Line 61, claim 9, delete "allay" and insert -- alloy --.

Signed and Sealed this
Thirtieth Day of August, 2011

David J. Kappos
*Director of the United States Patent and Trademark Office*